(12) United States Patent
Mizumura et al.

(10) Patent No.: US 12,519,892 B2
(45) Date of Patent: Jan. 6, 2026

(54) IMAGE PROCESSING APPARATUS, SYSTEM, COMPUTER READABLE MEDIUM, AND METHOD FOR DETERMINING IF DOCUMENT IS A LAYOUT OF PLURAL IMAGES ON SINGLE PAGE BASED ON COUNT OF BLACK POINTS

(71) Applicant: FUJIFILM Business Innovation Corp., Tokyo (JP)

(72) Inventors: Masahiko Mizumura, Kanagawa (JP); Seiji Shiraki, Kanagawa (JP); Nagamasa Misu, Kanagawa (JP); Yushiro Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 327 days.

(21) Appl. No.: 18/184,823

(22) Filed: Mar. 16, 2023

(65) Prior Publication Data

US 2024/0031494 A1    Jan. 25, 2024

(30) Foreign Application Priority Data

Jul. 25, 2022   (JP) ................................. 2022-118301

(51) Int. Cl.
*H04N 1/00*    (2006.01)
*G06T 7/11*    (2017.01)
(Continued)

(52) U.S. Cl.
CPC ........... *H04N 1/00005* (2013.01); *G06T 7/11* (2017.01); *G06T 7/136* (2017.01); *G06V 10/42* (2022.01);
(Continued)

(58) Field of Classification Search
CPC ........... H04N 1/00005; H04N 1/00037; H04N 1/00039; H04N 1/00068; H04N 1/00087;
(Continued)

(56) References Cited

U.S. PATENT DOCUMENTS 6,038,340 A * 3/2000 Ancin ..................... H04N 1/56
358/518
7,072,877 B2 * 7/2006 Kutsumi .............. G06V 30/413
706/45
(Continued)

FOREIGN PATENT DOCUMENTS

JP    H11-284846 A    10/1999
JP    2001184511 A *   7/2001
(Continued)

*Primary Examiner* — Scott A Rogers
(74) *Attorney, Agent, or Firm* — Oliff PLC (57) ABSTRACT

An image processing apparatus includes a processor configured to: obtain image information by reading a document image; divide a single page in the obtained image information on the basis of a predetermined block unit; count black points in each block obtained through the division; use the counting result of black points in each block to determine whether the document image is a layout image in which multiple images are allocated in a single page, and to detect and delete a blank-sheet image in the layout image.

11 Claims, 10 Drawing Sheets

(51) Int. Cl.
*G06T 7/136* (2017.01)
*G06V 10/42* (2022.01)
*G06V 10/50* (2022.01)
*H04N 1/38* (2006.01)
*H04N 1/387* (2006.01)

(52) U.S. Cl.
CPC ......... *G06V 10/50* (2022.01); *H04N 1/00037* (2013.01); *H04N 1/38* (2013.01); *H04N 1/3873* (2013.01); *G06T 2207/20164* (2013.01)

(58) Field of Classification Search
CPC .... H04N 1/00456; H04N 1/38; H04N 1/3873; H04N 1/40062; H04N 1/60723; G06T 7/10; G06T 7/11; G06T 7/136; G06T 2207/20164; G06V 10/42; G06V 10/50; G06F 3/1208; G06F 3/125

See application file for complete search history.

(56) References Cited

U.S. PATENT DOCUMENTS

| | | | | |
|---|---|---|---|---|
| 7,711,189 | B2 * | 5/2010 | Katsuyama | G06V 30/414 |
| | | | | 382/176 |
| 8,125,693 | B2 * | 2/2012 | Arai | H04N 1/38 |
| | | | | 358/1.9 |
| 9,203,997 | B2 * | 12/2015 | Yabuuchi | H04N 1/233 |
| 9,369,599 | B2 * | 6/2016 | Yabuuchi | H04N 1/00822 |
| 2003/0160976 | A1 * | 8/2003 | Suzuki | H04N 1/40068 |
| | | | | 358/1.2 |
| 2006/0274376 | A1 * | 12/2006 | Bailey | G06V 30/413 |
| | | | | 358/464 |
| 2024/0323290 | A1 * | 9/2024 | Shidara | G06T 5/40 |
| 2025/0088595 | A1 * | 3/2025 | Mizumura | H04N 1/00037 |

FOREIGN PATENT DOCUMENTS

| | | | |
|---|---|---|---|
| JP | 2001245074 A | * | 9/2001 |
| JP | 2005324351 A | * | 11/2005 |
| JP | 2009-017208 A | | 1/2009 |
| JP | 4884305 B2 | | 2/2012 |
| JP | 2016046550 A | * | 4/2016 |

* cited by examiner

IMAGE PROCESSING APPARATUS, SYSTEM, COMPUTER READABLE MEDIUM, AND METHOD FOR DETERMINING IF DOCUMENT IS A LAYOUT OF PLURAL IMAGES ON SINGLE PAGE BASED ON COUNT OF BLACK POINTS

CROSS-REFERENCE TO RELATED APPLICATIONS

This application is based on and claims priority under 35 USC 119 from Japanese Patent Application No. 2022-118301 filed Jul. 25, 2022.

BACKGROUND (i) Technical Field

The present disclosure relates to an image processing apparatus, an image processing system, a non-transitory computer readable medium, and an image processing method.

(ii) Related Art

Japanese Patent No. 4884305 discloses the following technique. After signal conversion, in which an input red green blue (RGB) signal is converted to a luminance signal, and resolution conversion, the feature value of each of the lines in the main scanning direction and the sub-scanning direction of an image is calculated. The feature values in each of the main scanning direction and the sub-scanning direction are analyzed to determine whether the image indicates a layout document on the basis of determination as to whether a single blank area is present in the main scanning direction and whether a single blank area is present in the sub-scanning direction.

Japanese Unexamined Patent Application Publication No. 2009-017208 discloses an image processing apparatus including a non-image portion extracting unit, a document division position determining unit, and an image shaping processor. The non-image portion extracting unit extracts a margin area in a document center portion of a layout document on the basis of the distribution of feature values of the lines in the main scanning direction. The document division position determining unit compares the center coordinates of the center of the margin area of the document center portion with the position coordinates of the center of the document, and determines the position at which the layout document is divided. When the position coordinates of the center of the margin area of the document center portion is separated from the position coordinates of the center of the document by at least a predetermined value, the image shaping processor performs edits of the image data (such as interpolation of the image data and reading control) so that the position coordinates of the center of the margin area match the position coordinates of the center of the document.

In such a technique in which feature values of an image are extracted and determination as to whether the image is a layout image in which multiple images are allocated in a single page is made for division, the division position may be erroneously determined when pixels, having pixel values which are not extracted as feature values, are distributed close to one another. In addition, such a technique fails to achieve detection and deletion of a blank-sheet image in a divided image obtained after division of a layout image.

SUMMARY

Aspects of non-limiting embodiments of the present disclosure relate to an image processing apparatus, an image processing system, a non-transitory computer readable medium, and an image processing method which enable a layout image to be divided correctly and enable a blank-sheet image in a divided image to be detected and deleted, compared with the case in which feature values of an image are used to determine whether the image is a layout image which is to be divided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus comprising a processor configured to: obtain image information by reading a document image; divide a single page in the obtained image information on a basis of a predetermined block unit; count black points in each block obtained through the division; use a counting result of black points in each block to determine whether the document image is a layout image in which a plurality of images are allocated in a single page, and to detect and delete a blank-sheet image in the layout image.

BRIEF DESCRIPTION OF THE DRAWINGS

Exemplary embodiment of the present disclosure will be described in detail based on the following figures, wherein.

DETAILED DESCRIPTION

Figure 1:
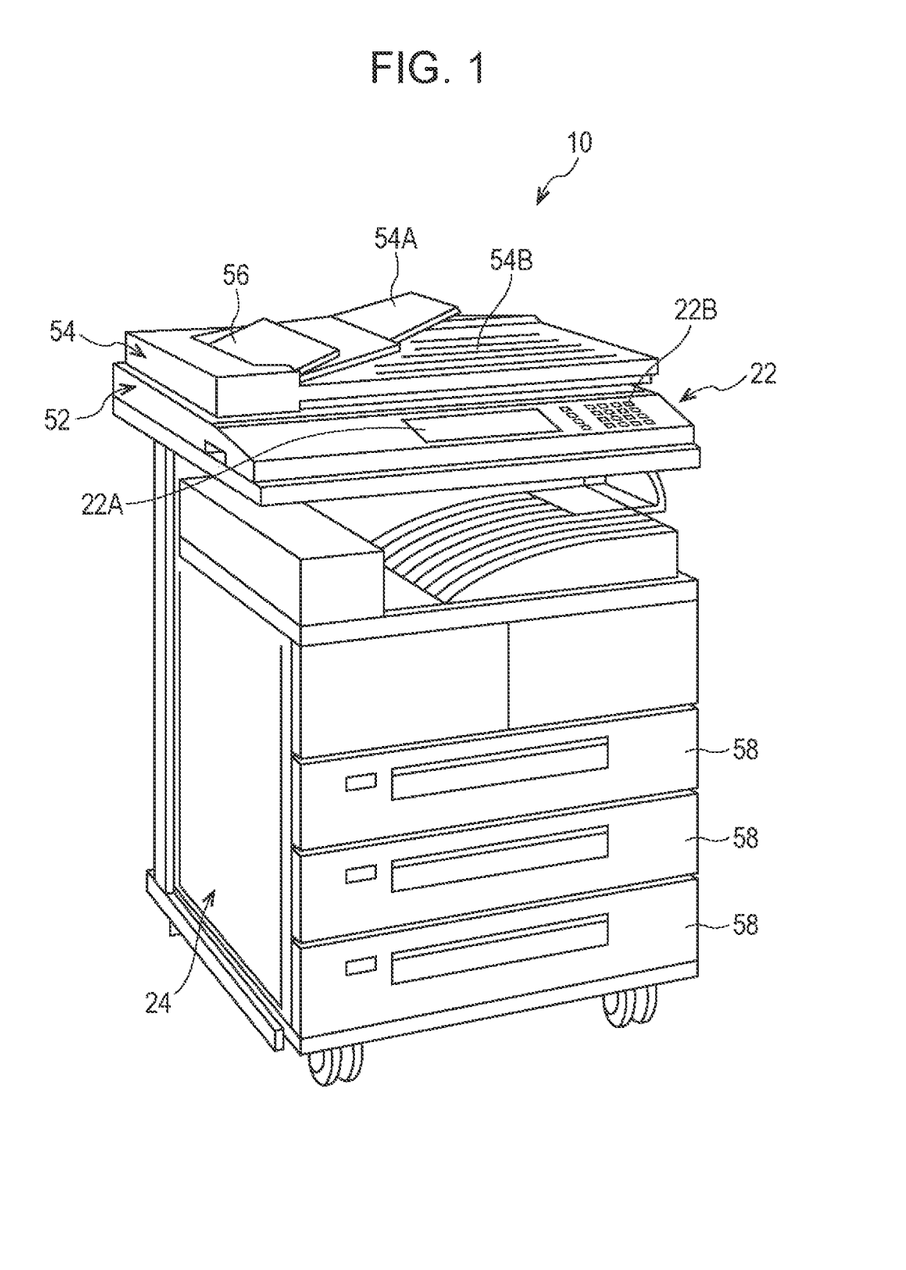
FIG. 1 is a perspective view of the appearance of an image forming apparatus according to the present exemplary embodiment.

An exemplary embodiment of the present disclosure will be described below in detail by referring to the drawings. In the exemplary embodiment, an image forming apparatus will be described as an exemplary image processing apparatus. FIG. 1 is a perspective view of the appearance of an image forming apparatus 10 according to the present exemplary embodiment. The image forming apparatus 10 according to the present exemplary embodiment has a printing function of receiving various types of data through a communication line such as a network and forming images based on the received data. The image forming apparatus 10 according to the present exemplary embodiment also has multiple functions, such as a reading function of reading a document to obtain image information indicating the document, a copying function of copying, onto sheets, images recorded on a document, a facsimile function of receiving/transmitting various types of data through a telephone line (not illustrated), a transfer function of transferring document information such as image information obtained through reading performed, for example, by using the reading function, and an accumulation function for accumulating document information such as image information obtained through reading.

In addition, the image forming apparatus 10 according to the present exemplary embodiment includes a document reading unit 52 in an upper portion of the apparatus, and an image forming unit 24 disposed below the document reading unit 52. The document reading unit 52 includes a document transport unit (not illustrated) in a document cover 54. The document transport unit pulls a document 56, one page by one page, which is put on a document feed unit 54A provided for the document cover 54, transports the document 56 onto platen glass (not illustrated), and reads images recorded on the document 56. The document transport unit discharges the document 56, from which images have been read, to a document discharge unit 54B provided for the document cover 54.

The document reading unit 52 includes a user interface 22 for receiving various instruction operations from users. The user interface 22 includes, for example, a display 22A, on which display buttons, for implementing reception of instruction operations by using software programs, and various types of information are displayed, and hardware keys 22B such as a numeric keypad. As the display 22A, a touch panel display, in which a display device such as a liquid-crystal panel is combined with a position input device such as a touchpad, is used. Through use of the display buttons on the display 22A and the hardware keys 22B, the user interface 22 is used, for example, in setting of the number of copies and setting of scaling in use of the copying function, and as telephone dial keys in use of the facsimile function. The hardware keys 22B are not necessarily included.

The image forming unit 24 includes sheet-feed storage units 58 in which sheets used as recording media for image formation are held. The image forming unit 24 takes out sheets, one by one, held in the sheet-feed storage units 58, and, for example, uses an electrophotographic process to form, on the sheets, images based on image data. The image forming unit 24 sequentially discharges sheets, on which images have been formed, onto a discharge unit (not illustrated).

Figure 2:
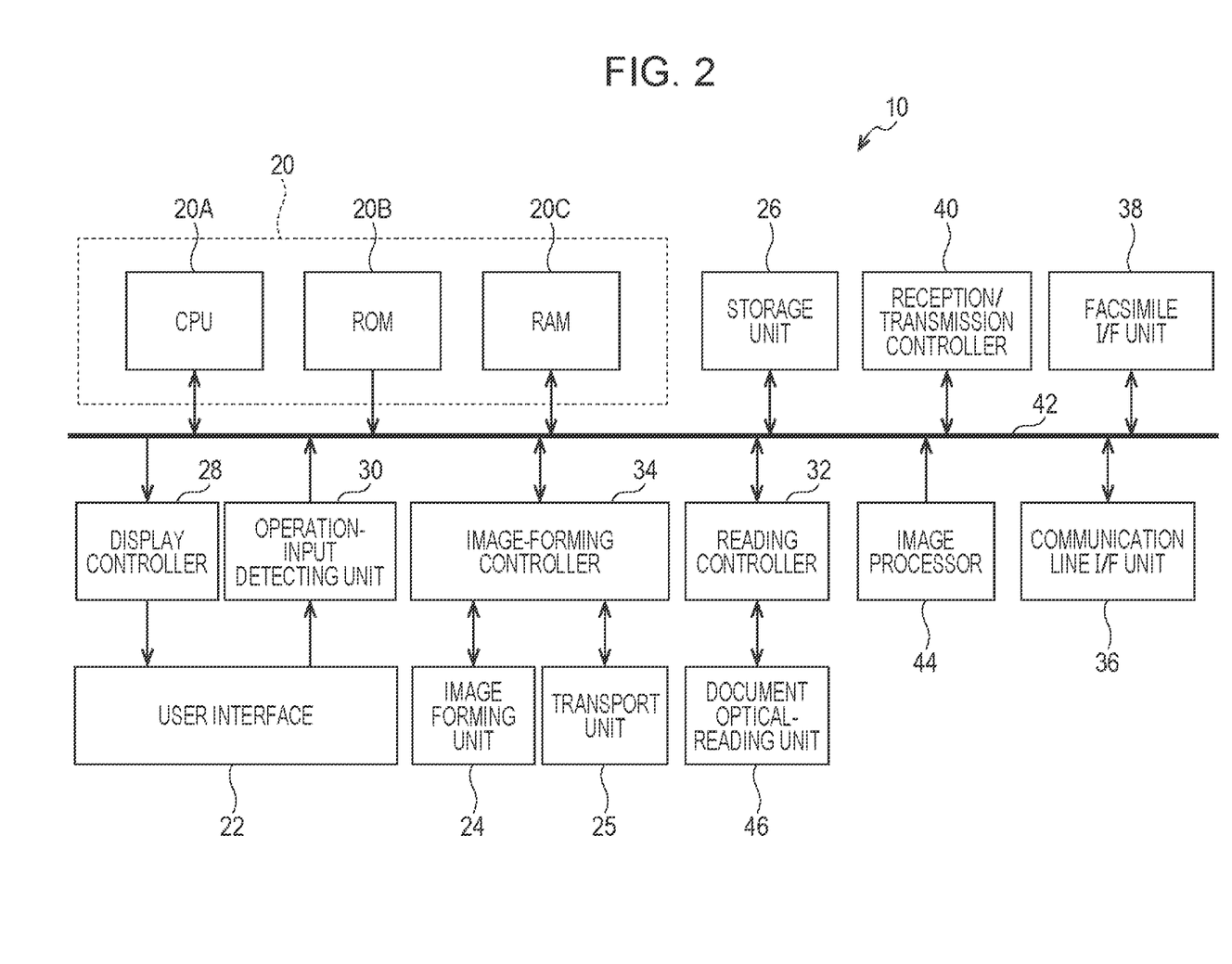
FIG. 2 is a block diagram illustrating the configuration of electrical components of an image forming apparatus according to the present exemplary embodiment.

FIG. 2 is a block diagram illustrating the configuration of electrical components of the image forming apparatus 10 according to the present exemplary embodiment.

As illustrated in FIG. 2, the image forming apparatus 10 according to the present exemplary embodiment includes a controller 20 including a central processing unit (CPU) 20A, a read only memory (ROM) 20B, and a random access memory (RAM) 20C. The CPU 20A controls the operations of the entire image forming apparatus 10. The RAM 20C is used, for example, as a work area used when the CPU 20A runs various programs. In the ROM 20B, for example, various control programs such as an image processing program and various parameters are stored in advance. In the image forming apparatus 10, the units of the controller 20 are electrically connected through a system bus 42.

The image forming apparatus 10 according to the present exemplary embodiment includes a storage unit 26 which stores, for example, various types of data and application programs. The image forming apparatus 10 also includes a display controller 28 which is connected to the user interface 22 and which controls display, for example, of various operation screens on the display 22A of the user interface 22. The image forming apparatus 10 also includes an operation-input detecting unit 30 which is connected to the user interface 22 and which detects operation instructions which are input through the user interface 22. In the image forming apparatus 10, the storage unit 26, the display controller 28, and the operation-input detecting unit 30 are electrically connected to the system bus 42. As the storage unit 26, for example, a hard disk drive (HDD) may be used, or a nonvolatile storage unit such as a flash memory may be used.

The image forming apparatus 10 according to the present exemplary embodiment includes a reading controller 32, which controls operations of optically reading images by using a document optical-reading unit 46 and operations of transporting a document by using the document transport unit, and an image-forming controller 34, which controls the image forming unit 24 forming images and a transport unit 25 transporting sheets to the image forming unit 24. The image forming apparatus 10 also includes a communication line interface (I/F) unit 36, which is connected to a communication line (not illustrated) and which receives/transmits communication data from/to different external apparatuses such as a server connected to the communication line, and an image processor 44, which performs various types of image processing. The image forming apparatus 10 also includes a facsimile interface (I/F) unit 38 which is connected to a telephone line (not illustrated) and which receives/transmits facsimile data from/to facsimiles connected to the telephone line. The image forming apparatus 10 also includes a reception/transmission controller 40 which controls reception/transmission of facsimile data through the facsimile I/F unit 38. In the image forming apparatus 10, the reception/transmission controller 40, the reading controller 32, the image-forming controller 34, the communication line I/F unit 36, the facsimile I/F unit 38, and the image processor 44 are electrically connected to the system bus 42.

In the configuration described above, the image forming apparatus 10 according to the present exemplary embodiment uses the CPU 20A to access the RAM 20C, the ROM 20B, and the storage unit 26. The image forming apparatus 10 uses the CPU 20A to control display of information, such as operation screens and various messages, on the display 22A of the user interface 22 through the display controller 28. The image forming apparatus 10 uses the CPU 20A to control operations of the document optical-reading unit 46 and the document transport unit through the reading controller 32. The image forming apparatus 10 uses the CPU 20A to control operations of the image forming unit 24 and the transport unit 25 through the image-forming controller 34, and to control reception/transmission of communication data through the communication line I/F unit 36. The image forming apparatus 10 uses the CPU 20A to control the reception/transmission controller 40 receiving/transmitting facsimile data through the facsimile I/F unit 38. The image forming apparatus 10 uses the CPU 20A to grasp operations on the user interface 22 on the basis of operation information detected by the operation-input detecting unit 30 and to exert various types of control based on the operations.

Figure 3:
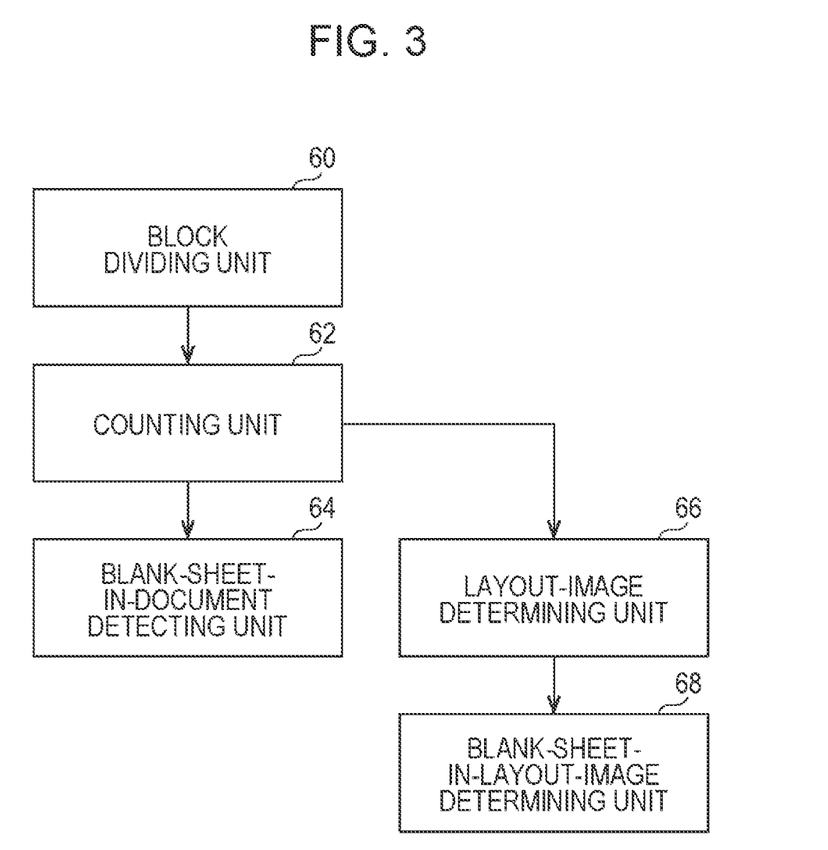
FIG. 3 is a block diagram illustrating an exemplary functional configuration of a controller of an image forming apparatus according to the present exemplary embodiment.

Next, the functional configuration, in the image forming apparatus 10 according to the present exemplary embodiment, implemented by the CPU 20A of the controller 20 loading, to the RAM 20C, programs stored in the ROM 20B and running the programs will be described. FIG. 3 is a block diagram illustrating an exemplary functional configuration of the controller 20 of the image forming apparatus 10 according to the present exemplary embodiment.

The controller 20 has functions of a block dividing unit 60, a counting unit 62, a blank-sheet-in-document detecting unit 64, a layout-image determining unit 66, and a blank-sheet-in-layout-image determining unit 68. In the present exemplary embodiment, the functional configuration in FIG. 3 will be described as functions of the controller 20. However, the configuration is not limited to this. For example, the functional configuration may be implemented by the image processor 44.

Figure 4:
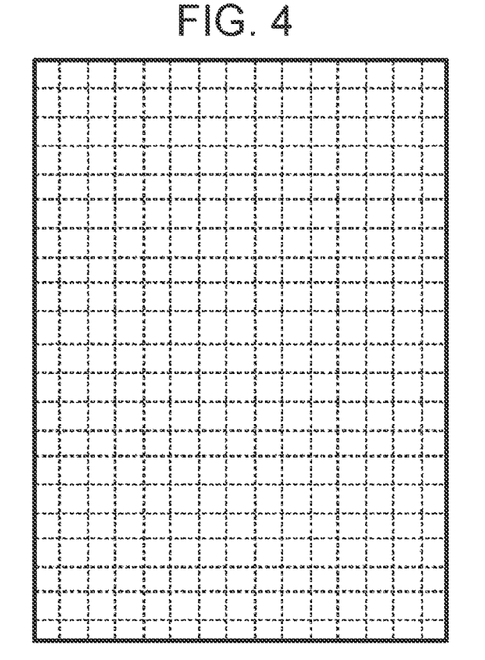
FIG. 4 is a diagram illustrating an example in which a single-page image is divided into multiple blocks.

The block dividing unit 60 divides, into blocks, each page in image information obtained by the document optical-reading unit 46 reading a document image. For example, as illustrated in FIG. 4, the block dividing unit 60 divides a single-page image into multiple blocks. FIG. 4 illustrates an example of division into 21×15 blocks.

The counting unit 62 counts black points which are present in each divided block, and stores the counting results, for example, in the RAM 20C. In the present disclosure, the black point is not limited to black, and refers to a pixel having a pixel value.

The blank-sheet-in-document detecting unit 64 determines whether a page in a document is blank, and deletes the blank page. The operation of detecting a blank page in a document is performed prior to determination as to whether the page has a layout image, and detection and deletion of a blank-sheet image in the layout image. In the present exemplary embodiment, the counting results from the counting unit 62 are read. If the number of black points in the area of the entire single page is less than a predetermined threshold, it is determined that the single page is blank. If the number of black points is greater than or equal to the threshold, it is determined that the single page is not blank.

Figure 5:
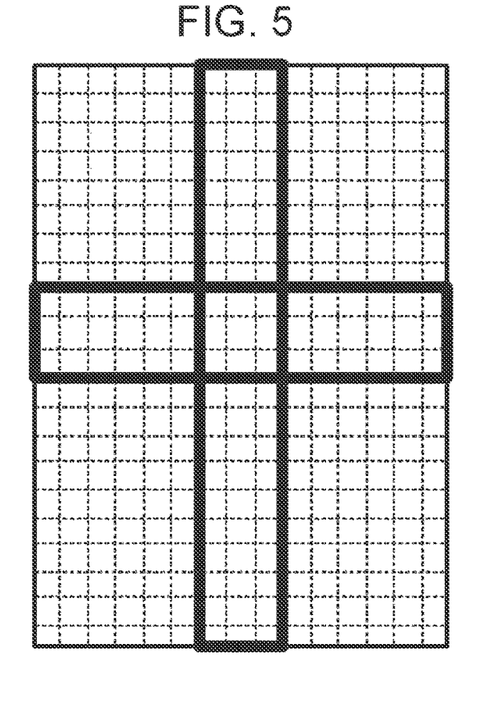
FIG. 5 is a diagram for describing how to determine whether a page has a layout image.

The layout-image determining unit 66 uses the counting results from the counting unit 62 to determine whether an image is a layout image in which multiple images are allocated. Specifically, as illustrated by using bold frames in FIG. 5, the number of black points in predetermined blocks (in FIG. 5, for example, three lines of block) among the blocks in a center portion in the main scanning direction is compared with a predetermined threshold for layout-image determination; the number of black points in predetermined blocks (in FIG. 5, for example, three lines of block) among the blocks in a center portion in the sub-scanning direction is compared with a predetermined threshold for layout-image determination. Thus, it is determined whether the image is a 2-up image, in which two images are allocated, or a 4-up image, in which four images are allocated. At that time, the allocation result for each page is stored, for example, in the RAM 20C.

The blank-sheet-in-layout-image determining unit 68 detects a blank-sheet image in a layout image by using the counting results from the counting unit 62 and deletes the region of the blank-sheet image.

A blank-sheet image in a layout image is detected by determining whether the sheet image is blank, by using a threshold predetermined in accordance with the number of allocations. For example, a 2-up threshold t1 for detecting a blank-sheet image and a 4-up threshold t2 for detecting a blank-sheet image are used. If the number of black points in an allocated region is less than the corresponding threshold, it is determined that the allocated region is blank.

Figure 6:
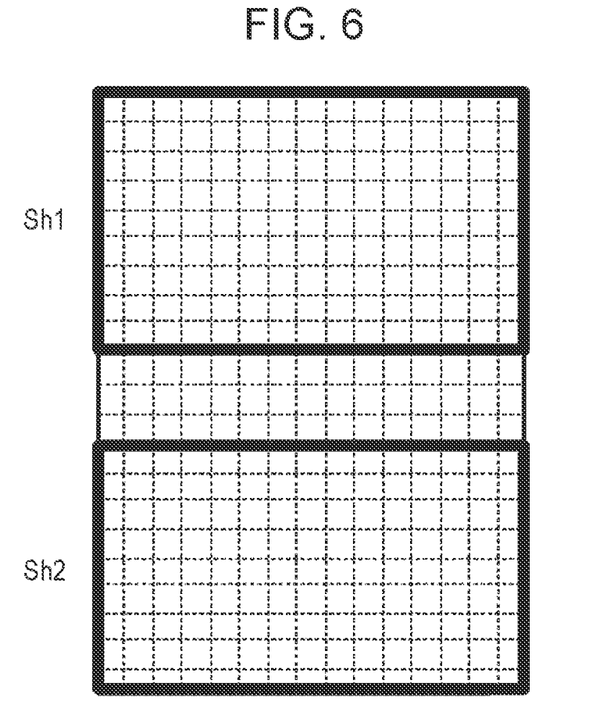
FIG. 6 is a diagram illustrating a 2-up image in the short edge feed (SEF) direction.
Figure 7:
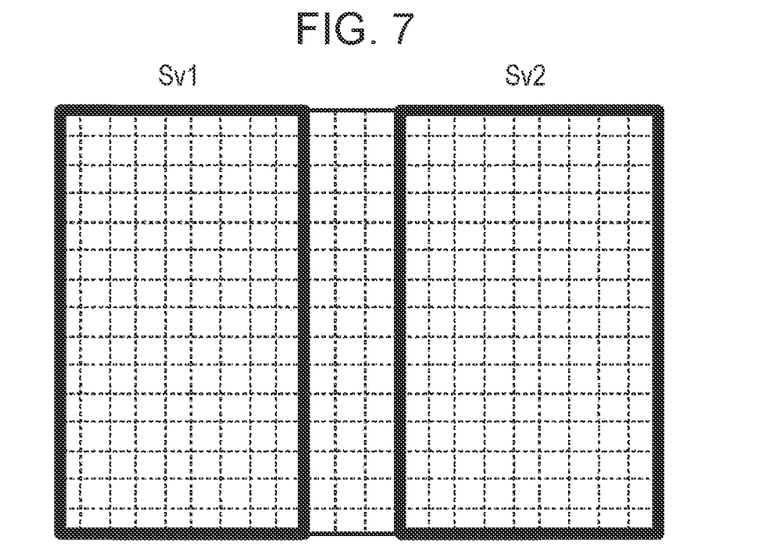
FIG. 7 is a diagram illustrating a 2-up image in the long edge feed (LEF) direction.

For example, if an image is determined to be a 2-up image, as illustrated by using the bold frames in FIGS. 6 and 7, the number of blocks, in the vertical or horizontal direction, in a selected region is different depending on whether the image is oriented in the portrait (SEF: Short edge feed) direction or the landscape (LEF: Long edge feed) direction. FIG. 6 illustrates a 2-up image in the SEF direction; FIG. 7 illustrates a 2-up image in the LEF direction. The total of black points in the blocks corresponding to the region of each bold frame, which is a division region obtained through division of a layout image, is compared with the predetermined threshold. If the total of black points is less than the threshold, the specified region is determined to be blank.

As illustrated in FIG. 6, if it is determined that an image in the SEF direction is divided into two divisions vertically, the total of black points in the blocks corresponding to a region Sh1 is compared with the predetermined threshold t1. If the total of black points is less than the threshold t1, it is determined that the region of the upper bold frame is blank. The total of black points in a region Sh2 is also compared with the threshold t1. If the total of black points is less than the threshold, it is determined that the region of the lower bold frame is blank.

As illustrated in FIG. 7, if it is determined that an image in the LEF direction is divided into two divisions horizontally, the total of black points in the blocks corresponding to a region Sv1 is compared with the predetermined threshold t1. If the total of black points is less than the threshold t1, it is determined that the region of the left bold frame is blank. The total of black points in a region Sv2 is also compared with the threshold t1. If the total of black points is less than the threshold, it is determined that the region of the right bold frame is blank.

Figure 8:
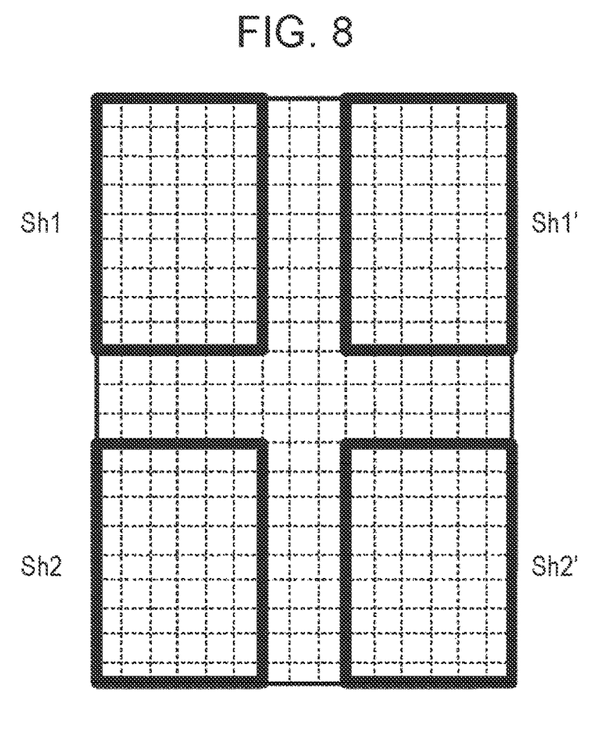
FIG. 8 is a diagram illustrating a 4-up image in the SEF direction.
Figure 9:
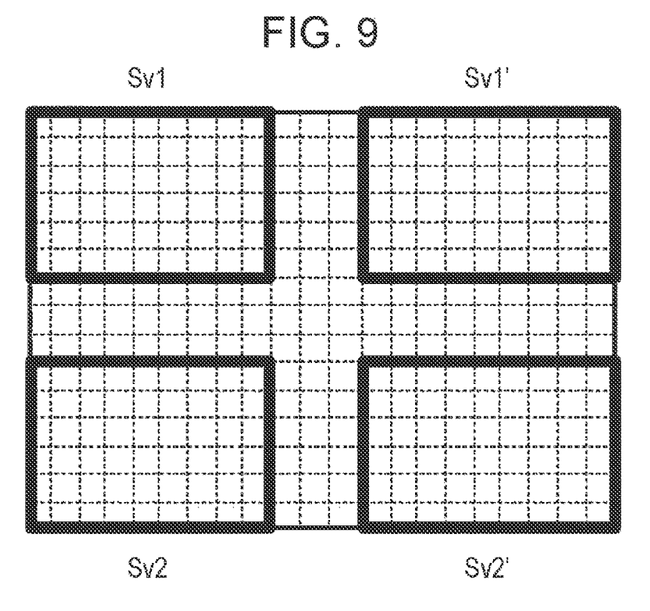
FIG. 9 is a diagram illustrating a 4-up image in the LEF direction.

If an image is determined to be a 4-up image, as illustrated by using the bold frames in FIGS. 8 and 9, the number of blocks, in the vertical or horizontal direction, in a selected region is different depending on whether the image is oriented in the SEF direction or the LEF direction. FIG. 8 illustrates a 4-up image in the SEF direction; FIG. 9 illustrates a 4-up image in the LEF direction. The total of black points in the region of each bold frame is compared with the predetermined threshold. If the total of black points is less than the threshold, it is determined that the specified region is blank.

As illustrated in FIG. 8, if it is determined that an image is divided into four divisions in the SEF direction, the total of black points in the blocks corresponding to a region Sh1 is compared with the predetermined threshold t2. If the total of black points is less than the threshold t2, it is determined that the region of the upper-left bold frame is blank. The total of black points in the region Sh1' is also compared with the threshold t2. If the total of black points is less than the threshold, it is determined that the region of the upper-right bold frame is blank. The total of black points in a region Sh2 is also compared with the threshold t2. If the total of black points is less than the threshold, it is determined that the region of the lower-left bold frame is blank. The total of black points in the region Sh2' is compared with the threshold t2. If the total of black points is less than the threshold, it is determined that the region of the lower-right bold frame is blank.

As illustrated in FIG. 9, if it is determined that an image is divided into four divisions in the LEF direction, the total of black points in the blocks corresponding to a region Sv1 is compared with the predetermined threshold t2. If the total of black points is less than the threshold t2, it is determined that the region of the upper-left bold frame is blank. The total of black points in a region Sv1' is also compared with the threshold t2. If the total of black points is less than the threshold, it is determined that the region of the upper-right bold frame is blank. The total of black points in a region Sv2 is also compared with the threshold t2. If the total of black points is less than the threshold, it is determined that the region of the lower-left bold frame is blank. The total of black points in a region Sv2' is also compared with the threshold t2. If the total of black points is less than the threshold, it is determined that the region of the lower-right bold frame is blank.

Figure 10:
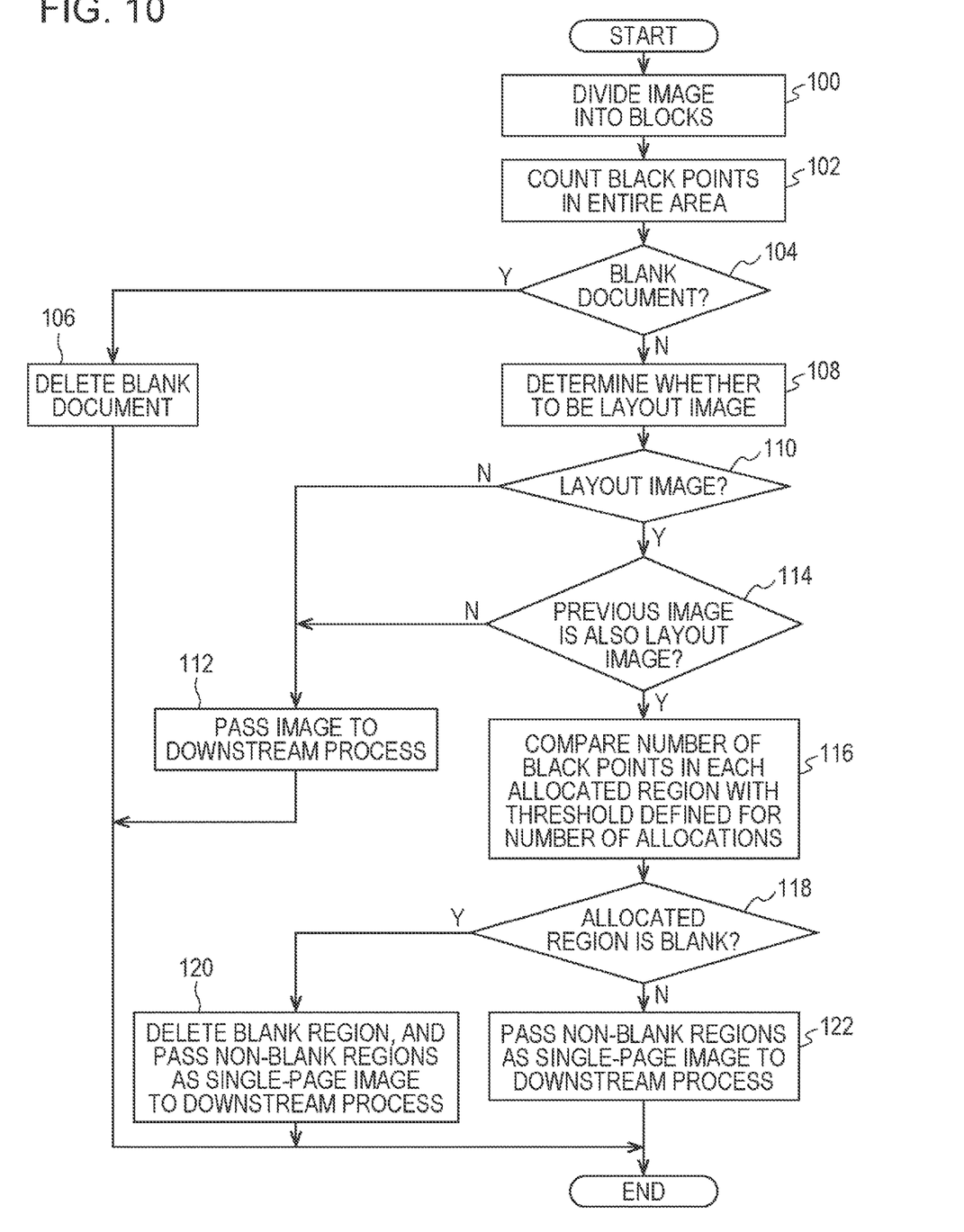
FIG. 10 is a flowchart of an exemplary process performed by a controller of an image forming apparatus according to the present exemplary embodiment.

Next, a specific process performed in the image forming apparatus 10, having the configuration described above, according to the present exemplary embodiment will be described. FIG. 10 is a flowchart of an exemplary process performed by the controller 20 of the image forming apparatus 10 according to the present exemplary embodiment. The process in FIG. 10 starts, for example, when the user interface 22 is operated to transmit a predetermined instruction on image information. The image information may be obtained through reading performed by the document optical-reading unit 46, or may be obtained through reading and stored in advance in the storage unit 26. In addition, description will be made under the condition that the process in FIG. 10 is performed on each page in image information. That is, the process in FIG. 10 is performed on a single page in the image information. When there is the next page, the process in FIG. 10 is also performed on the next page.

In step 100, the CPU 20A divides one page into blocks, and proceeds to step 102. That is, the block dividing unit 60 focuses on one page in the image information, and divides the single page into blocks. For example, as illustrated in FIG. 4, a single-page image is divided into blocks.

In step 102, the CPU 20A counts the black points in the entire area of the single page, and proceeds to step 104. That is, the counting unit 62 counts the number of black points which are present in each block in the single page, and stores the counting results, for example, in the RAM 20C.

In step 104, the CPU 20A determines whether the image indicates a blank document. In the determination, the blank-sheet-in-document detecting unit 64 reads the counting results obtained by the counting unit 62, and determines whether the number of black points in the entire area of the single page is less than the predetermined threshold. If the determination result is positive, the process proceeds to step 106. If the determination result is negative, the process proceeds to step 108.

In step 106, the CPU 20A deletes the blank document, and ends the series of processes. That is, the blank-sheet-in-document detecting unit 64 deletes the blank page of the document which is determined to be blank.

In contrast, in step 108, the CPU 20A determines whether the image is a layout image, and proceeds to step 110. That is, the layout-image determining unit 66 uses the counting results from the counting unit 62 to determine whether the image is a layout image in which multiple images are allocated. Specifically, as described above, the number of black points in predetermined blocks among the blocks in a center portion in the main scanning direction is compared with the predetermined threshold for layout-image determination; the number of black points in predetermined blocks among the blocks in a center portion in the sub-scanning direction is compared with the predetermined threshold for layout-image determination. Thus, it is determined whether the image is a 2-up image, in which two images are allocated, or a 4-up image, in which four images are allocated.

In step 110, the CPU 20A determines whether the determination result in step 108 indicates that the image is a layout image. If the determination result is negative, the process proceeds to step 112. If the determination result is positive, the process proceeds to step 114.

In step 112, the CPU 20A passes the page to a downstream process, and ends the series of processes. Examples of the downstream process include printing and storage in a file.

In contrast, in step 114, the CPU 20A determines whether a previous image is also a layout image. In the determination, for example, it is determined whether a predetermined previous page image, such as the previous page or the second previous page, is a layout image, or whether several continuous layout images are present before the page. If the determination result is negative, the process proceeds to step 112. If the determination result is positive, the process proceeds to step 116. The process in step 114 may be skipped.

In step 116, the CPU 20A compares the number of black points in each allocated region with the threshold defined for the number of allocations, and proceeds to step 118. That is, the blank-sheet-in-layout-image determining unit 68 compares the total of black points in each allocated region with the following threshold: in the case of a 2-up image, the 2-up threshold t1 for detecting a blank-sheet image, or, in the case of a 4-up image, the 4-up threshold t2 for detecting a blank-sheet image.

In step 118, the CPU 20A determines, for each of the allocated regions, whether the allocated region is blank. In the determination, the blank-sheet-in-layout-image determining unit 68 determines, for each of the allocated regions, whether the total of black points in the allocated region is less than the threshold defined for the number of allocations. If the determination result is positive, the process proceeds to step 120. If the determination result is negative, the process proceeds to step 122.

In step 120, the CPU 20A deletes the blank region, and passes the non-blank regions as a single-page image to the downstream process. Then, the CPU 20A ends the series of processes.

In contrast, in step 122, the CPU 20A passes the non-blank regions as a single-page image to the downstream process, and ends the series of processes.

Figure 11:
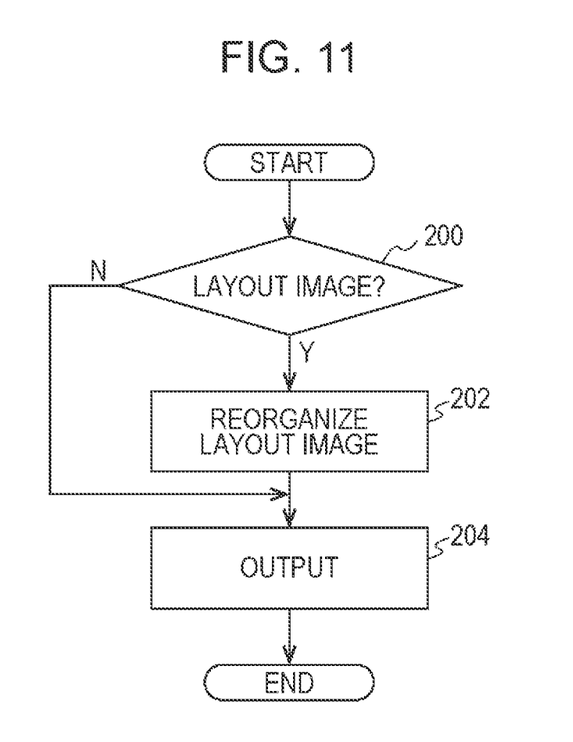
FIG. 11 is a flowchart of an exemplary downstream process.

Next, a concrete example of the downstream process will be described. FIG. 11 is a flowchart of an exemplary downstream process. Description will be made under the condition that, for example, the process in FIG. 11 starts after the process in FIG. 10 has been performed on all the pages in image information.

In step 200, the CPU 20A determines whether the image is a layout image. If the determination result is positive, the process proceeds to step 202. If the determination result is negative, the process proceeds to step 204.

In step 202, the layout image is reorganized, and the process proceeds to step 204. That is, when the layout image includes a blank region, the blank-sheet image has been deleted. Thus, a layout image, in which information from the next page occupies the position of the deleted blank-sheet image, is generated.

In step 204, the CPU 20A outputs the image information, and ends the series of processes. That is, the image information, from which blank pages have been deleted and which has layout images from which blank regions have been deleted, is stored in a folder, or is printed.

Figure 12:
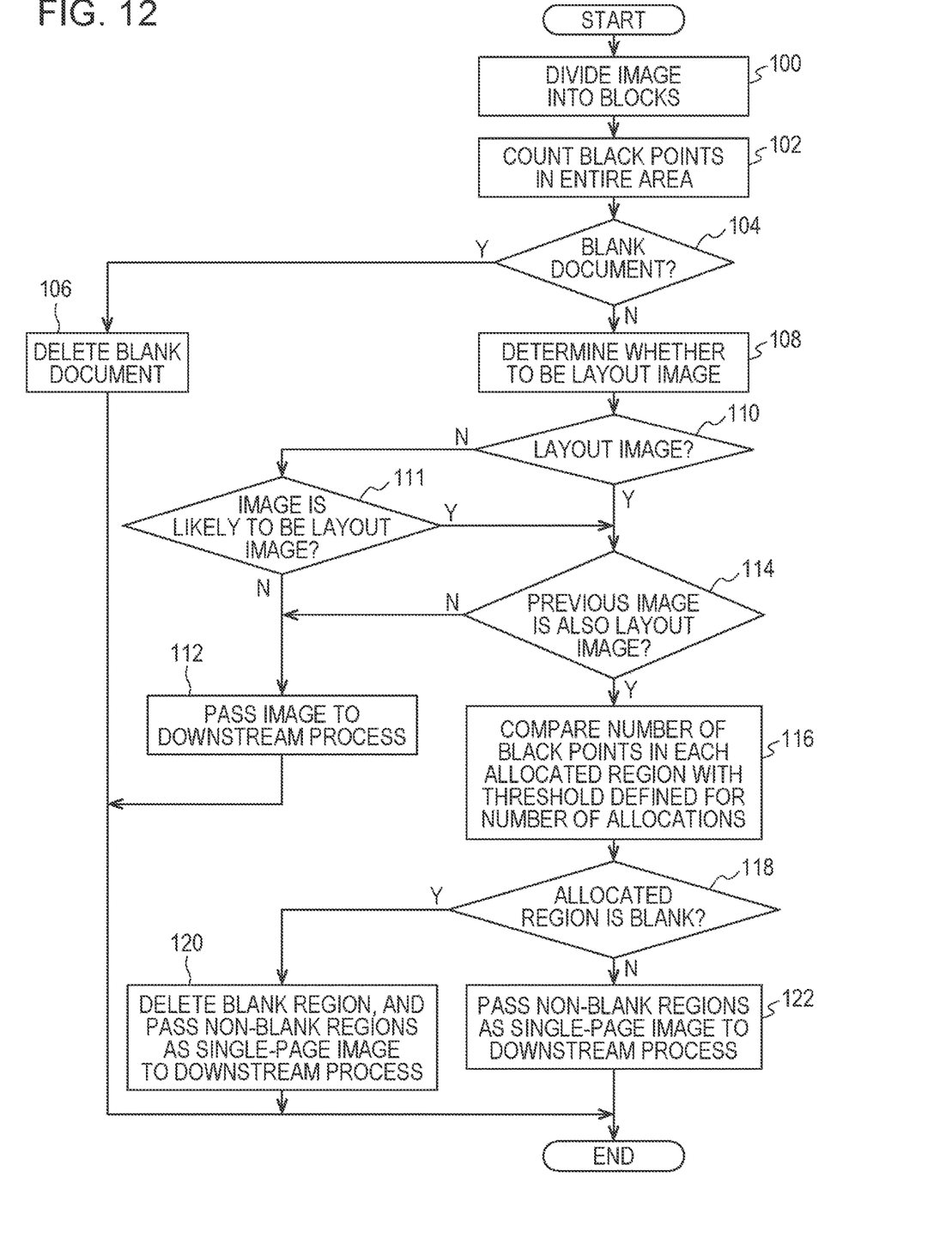
FIG. 12 is a flowchart of a modified example of a process performed by a controller of an image forming apparatus according to the present exemplary embodiment.

Next, a modified example of the flow of the process performed by the controller 20 of the image forming apparatus 10 according to the present exemplary embodiment will be described. FIG. 12 is a flowchart of a modified example of the process performed by the controller 20 of the image forming apparatus 10 according to the present exemplary embodiment. The same processes as those in FIG. 10 are designated with the same reference numerals, and will not be described in detail.

In the modified example, the process in step 111 is added to the process in FIG. 10. That is, when it is determined that the image is not a layout image in step 110, the process proceeds to step 111.

In step 111, the CPU 20A determines whether the image is likely to be a layout image. The determination as to whether the image is likely to be a layout image is made by determining whether a predetermined condition is satisfied. An example using the predetermined condition is determination as to whether a condition that the image is not a layout image and that the image has a center portion, in the horizontal direction, having black points, whose number is lower than a predetermined threshold, and/or has such a center portion in the vertical direction, is satisfied. For example, in the determination result for a layout image in step 108, an image, having a portion with black points whose number is less than the threshold, is determined to be a layout image. In step 111, it is determined whether the image has a portion with black points, the number of which falls in a predetermined range whose lower limit is the threshold. If the predetermined condition is satisfied and the determination result is positive, the process proceeds to step 114. If the determination result is negative, the process proceeds to step 112. That is, for an image which has been determined not to be a layout image but which is likely to be a layout image, the process proceeds to step 114, and it is determined whether a previous image is also a layout image. Thus, the state in which a layout image is erroneously determined not to be a layout image is suppressed. The predetermined condition may be any as long as it is a condition which enables determination as to whether an image is likely to be a layout image.

Figure 13:
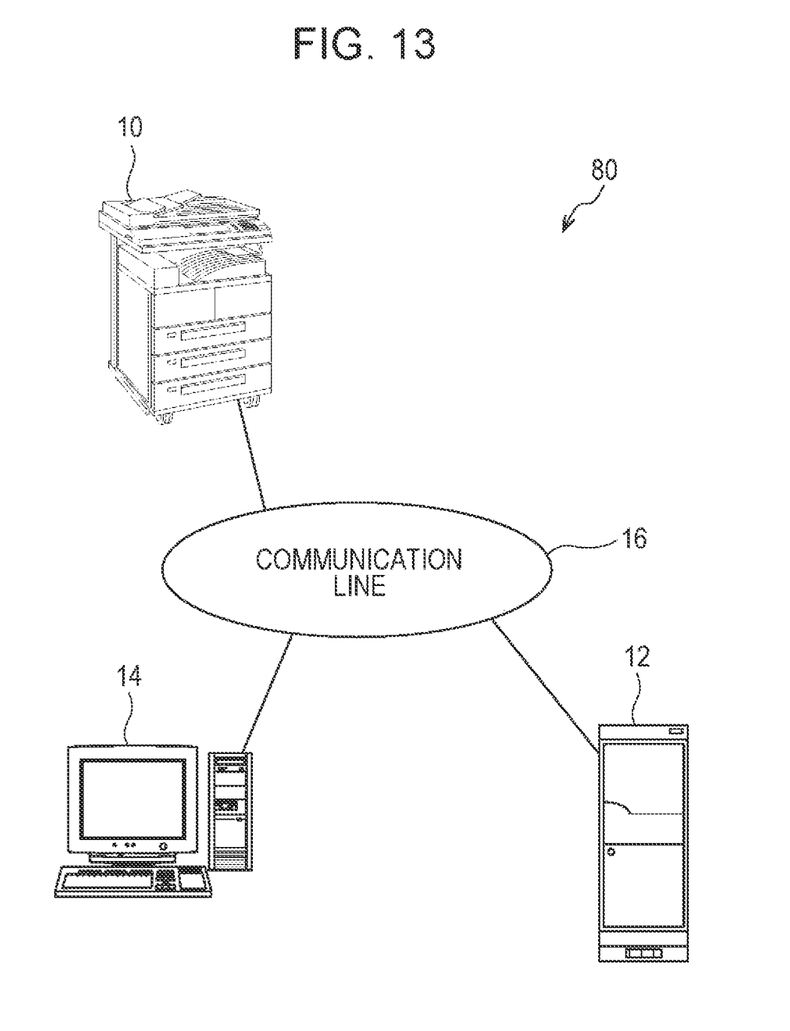
FIG. 13 is a diagram illustrating an exemplary image forming system according to the present exemplary embodiment.

In the exemplary embodiment described above, the example in which the image forming apparatus 10 performs the processes in FIGS. 10 and 11 is described. However, the configuration is not limited to this. For example, as illustrated in FIG. 13, an image processing system 80, in which the image forming apparatus 10 and either one or both of a client computer 14 and a server 12 such as a cloud server are connected to a communication line 16, may be used. In this case, the image forming apparatus 10 may be used as an image reading apparatus; the client computer 14 or the server 12 may be used as an image processing apparatus; the client computer 14 or the server 12 may perform at least one of the processes in FIGS. 10 and 11. In the case where an image forming system including both the client computer 14 and the server 12, the processes in FIGS. 10 and 12 may be performed by the client computer 14 and the server 12 which collaborate with each other.

In the embodiments above, the CPU is described as an exemplary processor. The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes performed by the image forming apparatus 10 according to the exemplary embodiment may be performed by using software, by using hardware, or by using a combination of both. The processes performed by the image forming apparatus 10 may be stored as programs in a storage medium for distribution.

The present disclosure is not limited to the exemplary embodiment described above. As a matter of course, other than the exemplary embodiment described above, various modifications may be made for implementation without departing from the gist of the present disclosure.

APPENDIX (((1)))
An image processing apparatus comprising:
a processor configured to:
obtain image information by reading a document image;
divide a single page in the obtained image information on a basis of a predetermined block unit;
count black points in each block obtained through the division;
use a counting result of black points in each block to determine whether the document image is a layout image in which a plurality of images are allocated in a single page, and to detect and delete a blank-sheet image in the layout image.

(((2)))
The image processing apparatus according to (((1))),
wherein the processor is configured to:
prior to the determination and the detection and deletion of a blank-sheet image, use the counting results to detect and delete a blank-sheet image for the entire single page.

(((3)))
The image processing apparatus according to (((1))) or (((2))),
wherein the processor is configured to:
perform the determination by using the counting results of predetermined blocks in a center portion in a main scanning direction in the image information and in a center portion in a sub-scanning direction in the image information.

(((4)))

The image processing apparatus according to any one of (((1))) to (((3))), wherein the processor is configured to:

in a case of the layout image, use the counting results of blocks corresponding to a division region to detect and delete a blank-sheet image in the division region, the division region being obtained through division into the plurality of images.

(((5)))

The image processing apparatus according to (((4))), wherein the processor is configured to:

if a total of the counting results of the blocks corresponding to the division region is less than a threshold predetermined in accordance with a count of allocations in the layout image, determine the division region to have a blank-sheet image, and delete the blank-sheet image.

(((6)))

The image processing apparatus according to any one of (((1))) to (((5))), wherein the processor is configured to:

perform the determination by using a result of the determination as to whether a previous page has a layout image.

(((7)))

The image processing apparatus according to (((6))), wherein the processor is configured to:

if a predetermined condition is satisfied, use the determination result for the previous page to perform the determination.

(((8)))

The image processing apparatus according to any one of (((1))) to (((7))), wherein the processor is configured to:

if the layout image includes a blank-sheet image, generate, for output, the layout image from which the blank-sheet image is deleted.

(((9)))

An image processing system comprising:

an image reading apparatus that reads a document image and generates image information; and the image processing apparatus according to (((1))).

(((10)))

An image processing program causing a computer to execute a process comprising:

obtaining image information by reading a document image;

dividing a single page in the obtained image information on a basis of a predetermined block unit;

counting black points in each block obtained through the division;

using a counting result of black points in each block to determine whether the document image is a layout image in which a plurality of images are allocated in a single page, and to detect and delete a blank-sheet image in the layout image.

What is claimed is:

1. An image processing apparatus comprising:

a processor configured to:

obtain image information by reading a document image;

divide a single page in the obtained image information on a basis of a predetermined block unit;

count black points in each block obtained through the division;

use a counting result of black points in each block to determine whether the document image is a layout image in which a plurality of images are allocated in a single page, and to detect and delete a blank-sheet image in the layout image.

2. The image processing apparatus according to claim 1, wherein the processor is configured to:

prior to the determination and the detection and deletion of a blank-sheet image, use the counting results to detect and delete a blank-sheet image for the entire single page.

3. The image processing apparatus according to claim 1, wherein the processor is configured to:

perform the determination by using the counting results of predetermined blocks in a center portion in a main scanning direction in the image information and in a center portion in a sub-scanning direction in the image information.

4. The image processing apparatus according to claim 1, wherein the processor is configured to:

in a case of the layout image, use the counting results of blocks corresponding to a division region to detect and delete a blank-sheet image in the division region, the division region being obtained through division into the plurality of images.

5. The image processing apparatus according to claim 4, wherein the processor is configured to:

if a total of the counting results of the blocks corresponding to the division region is less than a threshold predetermined in accordance with a count of allocations in the layout image, determine the division region to have a blank-sheet image, and delete the blank-sheet image.

6. The image processing apparatus according to claim 1, wherein the processor is configured to:

perform the determination by using a result of the determination as to whether a previous page has a layout image.

7. The image processing apparatus according to claim 6, wherein the processor is configured to:

if a predetermined condition is satisfied, use the determination result for the previous page to perform the determination.

8. The image processing apparatus according to claim 1, wherein the processor is configured to:

if the layout image includes a blank-sheet image, generate, for output, the layout image from which the blank-sheet image is deleted.

9. An image processing system comprising:

an image reading apparatus that reads a document image and generates image information; and the image processing apparatus according to claim 1.

10. A non-transitory computer readable medium storing a program causing a computer to execute a process for image processing, the process comprising:

obtaining image information by reading a document image;

dividing a single page in the obtained image information on a basis of a predetermined block unit;

counting black points in each block obtained through the division;

using a counting result of black points in each block to determine whether the document image is a layout image in which a plurality of images are allocated in a single page, and to detect and delete a blank-sheet image in the layout image.

11. An image processing method comprising:
obtaining image information by reading a document image;
dividing a single page in the obtained image information on a basis of a predetermined block unit;
counting black points in each block obtained through the division;
using a counting result of black points in each block to determine whether the document image is a layout image in which a plurality of images are allocated in a single page, and to detect and delete a blank-sheet image in the layout image.

\* \* \* \* \*